(12) United States Patent
Wagoner

(10) Patent No.: US 12,504,076 B2
(45) Date of Patent: Dec. 23, 2025

(54) WIPER SEAL FOR A BALL SCREW ACTUATOR

(71) Applicant: TRELLEBORG SEALING SOLUTIONS US, INC., Ft. Wayne, IN (US)

(72) Inventor: Samuel David Wagoner, Falmouth, IN (US)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 0 days.

(21) Appl. No.: 18/420,707

(22) Filed: Jan. 23, 2024

(65) Prior Publication Data
US 2024/0247720 A1    Jul. 25, 2024

Related U.S. Application Data

(60) Provisional application No. 63/481,572, filed on Jan. 25, 2023.

(51) Int. Cl.
*F16J 15/3232* (2016.01)
*F16H 25/22* (2006.01)
(Continued)

(52) U.S. Cl.
CPC ...... *F16J 15/3232* (2013.01); *F16H 25/2418* (2013.01); *F16J 15/3284* (2013.01); *F16H 25/2204* (2013.01)

(58) Field of Classification Search
CPC .. F16J 15/3232; F16J 15/3236; F16J 15/3284; F16H 25/24; F16H 25/2409;
(Continued)

(56) References Cited

U.S. PATENT DOCUMENTS 4,053,167 A * 10/1977 Jelinek ............... F16H 25/2418
277/354
4,905,533 A *  3/1990 Benton ............... F16H 25/2418
277/354
(Continued)

FOREIGN PATENT DOCUMENTS

DE          25 37 713 A1    3/1977
EP          3 392 526 B1    8/2020
(Continued)

*Primary Examiner* — Nathan Cumar
(74) *Attorney, Agent, or Firm* — Orbit IP, LLP; Marc G. Martino

(57) ABSTRACT

A wiper seal assembly for sealing a ball screw actuator includes a seal element. An inside circumferential surface comprises a first helically shaped extension having a first pitch and is configured to be disposed within a roller ball screw thread. At least one wiping bead being a second helically shaped extension having a second pitch extending towards a longitudinal axis is disposed at least partially over the first helically shaped extension. The at least one wiping bead is configured to make contact with the roller ball screw thread. A cylindrical ring is in contact with and at least partially disposed about the seal element. The seal element is at least partially bonded to the cylindrical ring. The seal element has a first coefficient of thermal expansion and the cylindrical ring has a different second coefficient of thermal expansion.

21 Claims, 7 Drawing Sheets

(51) Int. Cl.
*F16H 25/24* (2006.01)
*F16J 15/3284* (2016.01)

(58) Field of Classification Search
CPC .. F16H 25/2427; F16H 25/2418; F16H 25/22; F16H 25/2204; F16H 25/2209; F16H 25/2214; F16H 25/2219; F16H 25/2223; F16H 25/2228
USPC .......................................................... 277/550
See application file for complete search history.

(56) References Cited

U.S. PATENT DOCUMENTS

| | | | | |
|---|---|---|---|---|
| 6,976,399 | B2* | 12/2005 | Michioka | F16J 15/26 277/354 |
| 8,025,128 | B2* | 9/2011 | Iwasaki | F16H 57/0497 184/5 |
| 10,612,633 | B2* | 4/2020 | Nishide | F16J 15/3268 |
| 10,935,116 | B2* | 3/2021 | Kubota | F16H 25/22 |
| 10,975,941 | B2* | 4/2021 | Fages | F16J 15/32 |
| 2010/0288063 | A1* | 11/2010 | Wu | F16H 25/2418 74/424.81 |
| 2014/0190287 | A1* | 7/2014 | Garrett | F16H 25/2418 277/300 |
| 2014/0352470 | A1* | 12/2014 | Hsieh | F16H 25/2418 74/424.82 |

FOREIGN PATENT DOCUMENTS

| | | | |
|---|---|---|---|
| EP | 3 428 481 B1 | | 8/2021 |
| JP | H05-44810 A | | 2/1993 |
| JP | 3647597 B2 | | 5/2005 |
| JP | 4482168 B2 | | 6/2010 |
| JP | 4923624 B2 | | 4/2012 |
| KR | 20150135594 A | * | 12/2015 |
| KR | 10-1584435 B1 | | 1/2016 |
| TW | 201022556 A | * | 6/2010 |
| TW | 201122272 A | * | 7/2011 |

* cited by examiner

WIPER SEAL FOR A BALL SCREW ACTUATOR

CROSS-REFERENCE TO RELATED APPLICATIONS

This application claims priority to provisional application 63/481,572, filed Jan. 25, 2023, the entire contents of which are hereby incorporated in full by this reference.

DESCRIPTION

Field of the Invention

The present invention generally relates to seals. More particularly, the present invention relates to a ball screw seal for a ball screw actuator used in aerospace and industrial applications.

Background of the Invention

Ball screw actuators need seals to seal grease within the actuator. Furthermore, these seals should be able to break externally formed ice while keeping external debris from ingressing (i.e., entering) into the actuator and other flight systems. Current solutions that have been designed are not fully successful in applications with high temperature variability and have had issues with drag. The present invention overcomes these drawbacks.

Prior art publication and patents include but are not limited to the following: EP 3 392 526 B1; EP 3 428 481 B1; U.S. Pat. Nos. 4,905,533; 10,612,633; KR 101 584 435 B1; US 697 639 9B2; JP 492 362 4B2; JP 492 362 4B2; US 201 403 524 70A1; JP 364 759 7B2; US 802 512 8B2; US 490 553 3A; and EP 3 428 481 B1.

SUMMARY OF THE INVENTION

An embodiment of the present invention is a wiper seal assembly 10 configured for sealing a ball screw actuator 11. A seal element 12 is annularly disposed about a longitudinal axis 13. The seal element defines a front side 14 opposite a back side 15, where the front and back sides are generally perpendicular to the longitudinal axis. The seal element defines an outside circumferential surface 16 opposite an inside circumferential surface 17, where the outside and inside circumferential surfaces are generally parallel with the longitudinal axis. The inside circumferential surface comprises a first helically shaped extension 18 having a first pitch 50 extending towards the longitudinal axis. The first helically shaped extension is configured to be disposed within a roller ball screw thread 19 of a shaft 20 of the ball screw actuator. The shaft is configured to be aligned along the longitudinal axis. A clearance 51 is configured to be between the first helically shaped extension and the roller ball screw thread.

The inside circumferential surface also comprises at least one wiping bead 52 being a second helically shaped extension 53 having a second pitch 54 extending towards the longitudinal axis. The at least one wiping bead is disposed at least partially over the first helically shaped extension. The at least one wiping bead is configured to make contact with the roller ball screw thread of the shaft of the ball screw actuator.

A cylindrical ring 55 is annularly disposed about the longitudinal axis and extends a distance 56 along the longitudinal axis. The cylindrical ring defines a front side 57 opposite a back side 58, where the front and back sides are generally perpendicular to the longitudinal axis. The cylindrical ring defines an outside circumferential surface 59 opposite an inside circumferential surface 60, where the outside and inside circumferential surfaces being generally parallel with longitudinal axis. The cylindrical ring is in contact with and at least partially disposed about the seal element. The seal element is at least partially bonded to the cylindrical ring.

In another exemplary embodiment, the seal element may have a first coefficient of thermal expansion 61 and the cylindrical ring may have a second coefficient of thermal expansion 62. The first coefficient of thermal expansion of the seal element may be larger than the second coefficient of thermal expansion of the cylindrical ring.

In another exemplary embodiment, the seal element may be made of an elastomer. For example, the seal element may be made of fluorosilicone, fluorovinylmethylsiloxane rubber (FVMQ), nitrile (NBR), hydrogenated nitrile (HNBR), fluorocarbon (FKM), silicone (VMQ), liquid silicone resin (LSR), thermoplastic elastomer (TPE) and/or any combination thereof. The seal element may have a Shore A hardness range of 40 to 80.

In another exemplary embodiment, the cylindrical ring may be made of a metal. Alternatively, the cylindrical ring may be made of stainless steel, steel, aluminum, plastic and/or any combination thereof.

In another exemplary embodiment, the first pitch of the first helically shaped extension and second pitch of the second helically shaped extension may be different. Alternatively, the first pitch of the first helically shaped extension and the second pitch of the second helically shaped extension may be in a similar helical direction 63. Alternatively, the first pitch of the first helically shaped extension and the second pitch of the second helically shaped extension may be in an opposite helical direction 64. Alternatively, the first pitch of the first helically shaped extension and the second pitch of the second helically shaped extension may be the same.

In another exemplary embodiment, an ice breaker element 23 may be annularly disposed about the longitudinal axis, the ice breaker element defining a front side 24 opposite a back side 25, the front and back sides being generally perpendicular to the longitudinal axis. The ice breaker element may define an outside circumferential surface 26 opposite an inside circumferential surface 27, the outside and inside circumferential surfaces being generally parallel with longitudinal axis. The inside circumferential surface comprises a third helically shaped extension 28 extending towards the longitudinal axis, wherein the third helically shaped extension is configured to be disposed within the roller ball screw thread of the shaft of the ball screw actuator. The third helically shaped extension extends to the front side of the ice breaker element forming an ice breaker lip 29. When included, the seal element is disposed adjacent to the ice breaker element with the back side of the seal element being adjacent to the back side of the ice breaker element. It is understood from this teaching that the first helically shaped extension is helically aligned in comparison to the third helically shaped extension, wherein both the first and third helically shaped extensions are configured to be disposed within the roller ball screw thread of the shaft of the ball screw actuator. An edge 33 of the ice breaker lip is configured to be at or less than 0.005 inches (0.13 millimeters) from the roller ball screw thread of the shaft of the ball screw actuator. The seal element and the ice breaker element could be different materials, such that they are not the same materials. Furthermore, the ice breaker element may comprise aluminum bronze and/or stainless steel.

In another exemplary embodiment, an annular bead 65 may be disposed about the longitudinal axis and extending from the front side of the seal element.

In another exemplary embodiment, when the wiper seal assembly is installed between an outer housing 41 and the shaft of the ball screw actuator, the front side of the seal element is configured to be disposed towards a grease side 42 and the rear side of the seal element is configured to be disposed towards an environmental side 43.

In another exemplary embodiment, at least one clocking feature 66 may extend radially to the longitudinal axis from the outside circumferential surface of the cylindrical ring. The at least one clocking feature is configured to be disposed within at least one recess 47 formed in an outer housing 41 and mechanically locks in rotation the cylindrical ring and seal element in comparison to the outer housing.

Likewise, in another exemplary embodiment, at least one second clocking feature 46 may extend radially to the longitudinal axis from the outside circumferential surface of the ice breaker element. The at least one second clocking feature is configured to be disposed within the at least one recess 47 formed in the outer housing 41 and mechanically locks in rotation the ice breaker element in comparison to the outer housing.

BRIEF DESCRIPTION OF THE DRAWINGS

The accompanying drawings illustrate the invention. In such drawings.

DETAILED DESCRIPTION OF EMBODIMENTS OF THE INVENTION

Figure 1:
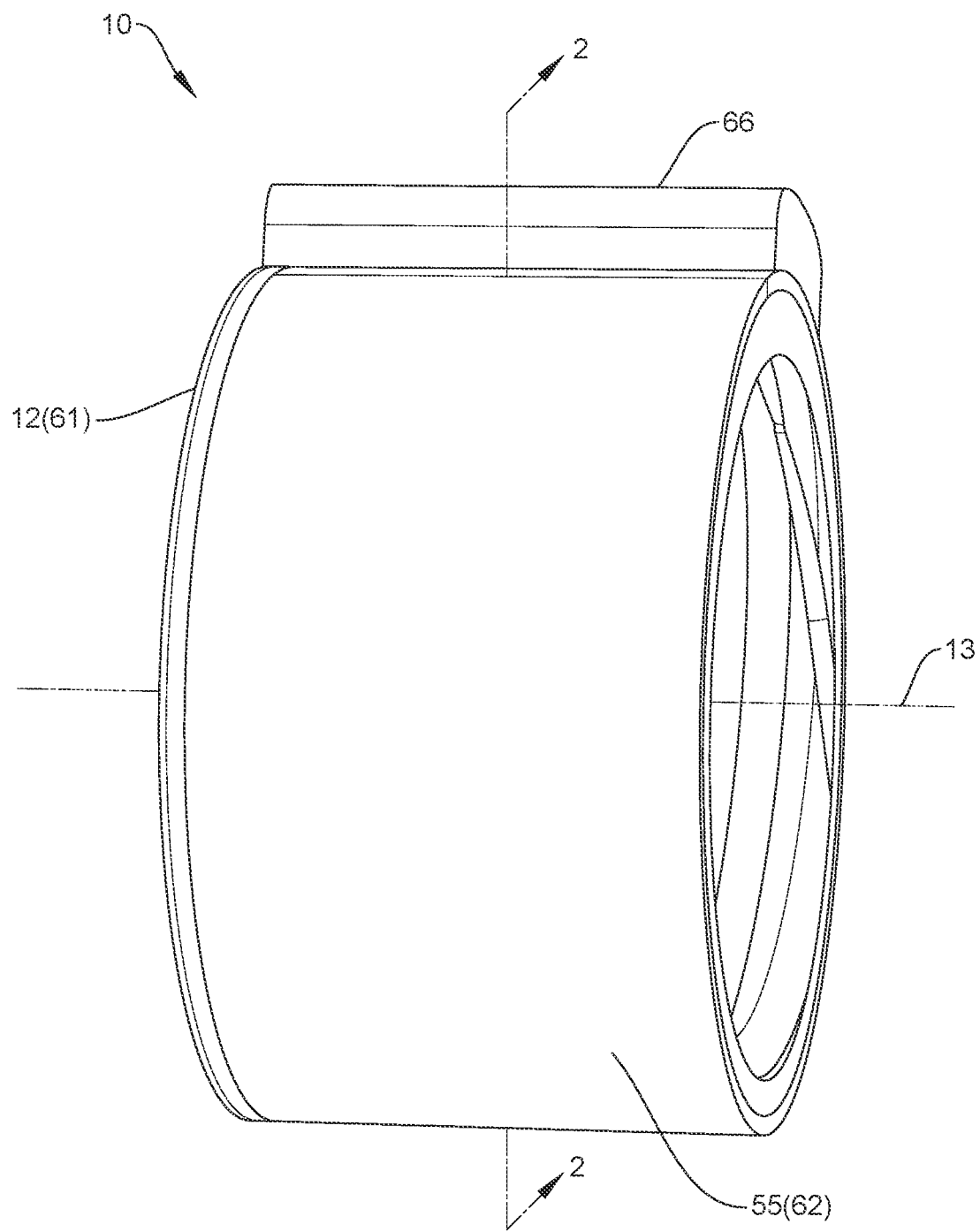
FIG. 1 is an isometric view of an embodiment of a wiper seal assembly of the present invention.
Figure 2:
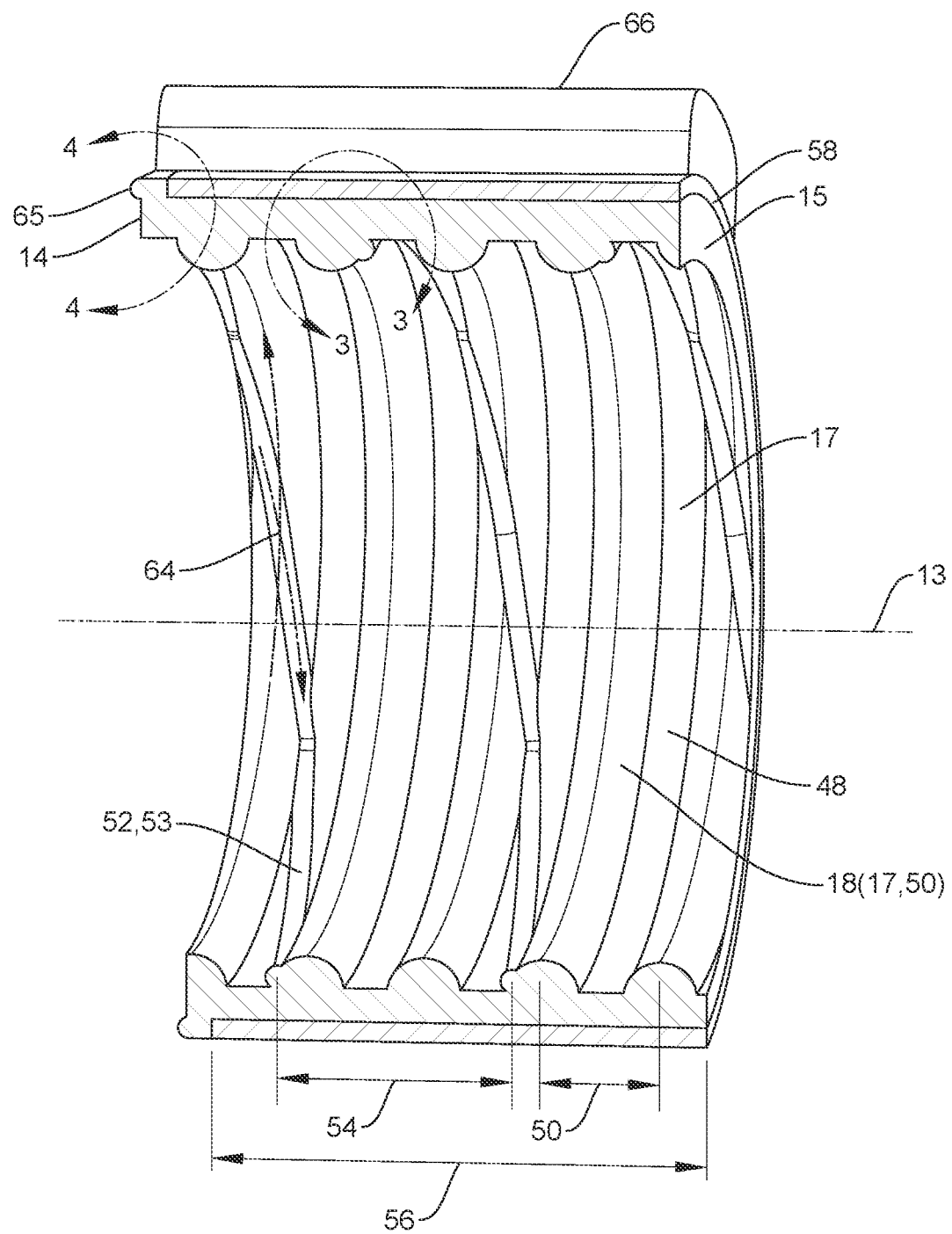
FIG. 2 is a sectional view of the structure of FIG. 1 taken along lines 2-2.

Reference is now made to FIGS. 1-6 of the provisional application 63/481,572. FIG. 1 is an isometric view of the present invention. FIG. 2 is a sectional view through the structure of FIG. 1. A metal ring surrounds the seal. The metal ring helps support the seal during shrinkage in cold testing. The metal ring can be made as a stainless-steel sleeve for the temperature extremes and corrosion resistance. The metal ring could also be made from steel, aluminum, plastic or any combination thereof.

Inside of the metal ring is elastomer seal, such as fluorosilicone, fluorovinylmethylsiloxane rubber (FVMQ), nitrile (NBR), hydrogenated nitrile (HNBR), fluorocarbon (FKM), silicone (VMQ), liquid silicone resin (LSR), thermoplastic elastomer (TPE) or any elastomer appropriate for the application environment. The hardness will likely be in the 40-80 Shore A range. The inside of the seal has a main helical thread that is configured to match the threads of the ball screw actuator with a clearance between the elastomer and the ball screw shaft.

The seal is a bi-directional pumping seal with light contact along a small wiping bead to help with friction reduction. This seal is bidirectional unlike prior art designs and has a modular design that can be customized to include an ice scraper.

This seal of the present invention is bidirectional, because as the ball screw shaft turns and extends the small, counter thread wipes the grease off the shaft and pushes it back into the grease reservoir. As it retracts the same counter thread wipes dust and water off the shaft and pushes it back towards the outside of the ball screw nut.

Figure 3:
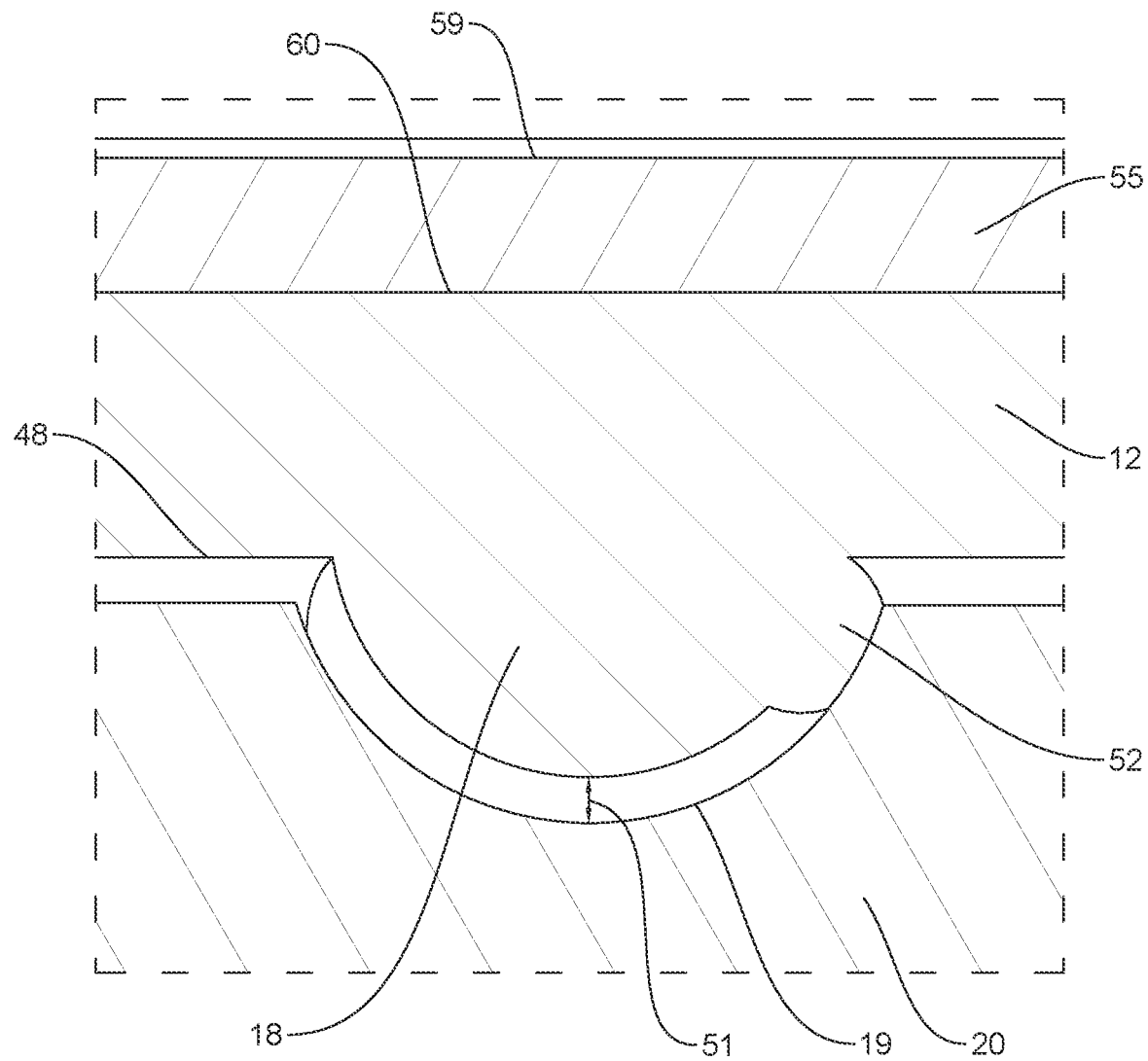
FIG. 3 is an enlarged sectional view taken along lines 3-3 from FIG. 2 now showing the internal shaft of the ball screw actuator.

FIG. 3 is an enlarged view of a portion of the cross section of FIG. 2 now better showing the small wiping bead that is of a different pitch in comparison to the main helical threads of the ball screw actuator.

The seal of the present invention is a modular design. The axial length can be adjusted to fit the space available, and an ice scraper can be stacked on the end (which is not shown). The number of counter threads can be adjusted to match the needs of the application. The thread pitch can be adjusted to match the needs of the application.

An ice scraper can be included. As noted above, it is stacked in series (see FIG. 5) with seal to provide ice breaking capability. It can, also, be integrated within the metal sleeve to make it a "one-piece" assembly (See FIG. 6).

There are several points of novelty of the present invention. There is the ability to provide an airtight seal to the ball screw shaft. Additionally, there is the ability to wipe grease off the shaft and push it back into the grease reservoir. Likewise, there is the ability to wipe dust and water off the shaft and push it back to the outside of the seal.

As can be appreciated, the metal sleeve has the elastomer bonded to the inner diameter. In harsh cold environments the elastomer will shrink faster than the steel sleeve and will reduce the interference on the shaft and reduce the torque required to turn the shaft. Because the elastomer is bonded to the metal sleeve the OD of the elastomer cannot move. The elastomer will shrink towards the "fixed" surface of the metal sleeve ID. The coefficient of thermal expansion (CTE) for elastomer is larger than for metal. Therefore, the ID of the seal will increase, and the torque will decrease as the temperature decreases.

There are differences between this present invention and prior art ball screw seals. Prior art seals: do not provide an air seal; do not effectively retain grease; do not effectively keep contamination out; and dramatically increase torque in extreme cold conditions.

Figure 4:
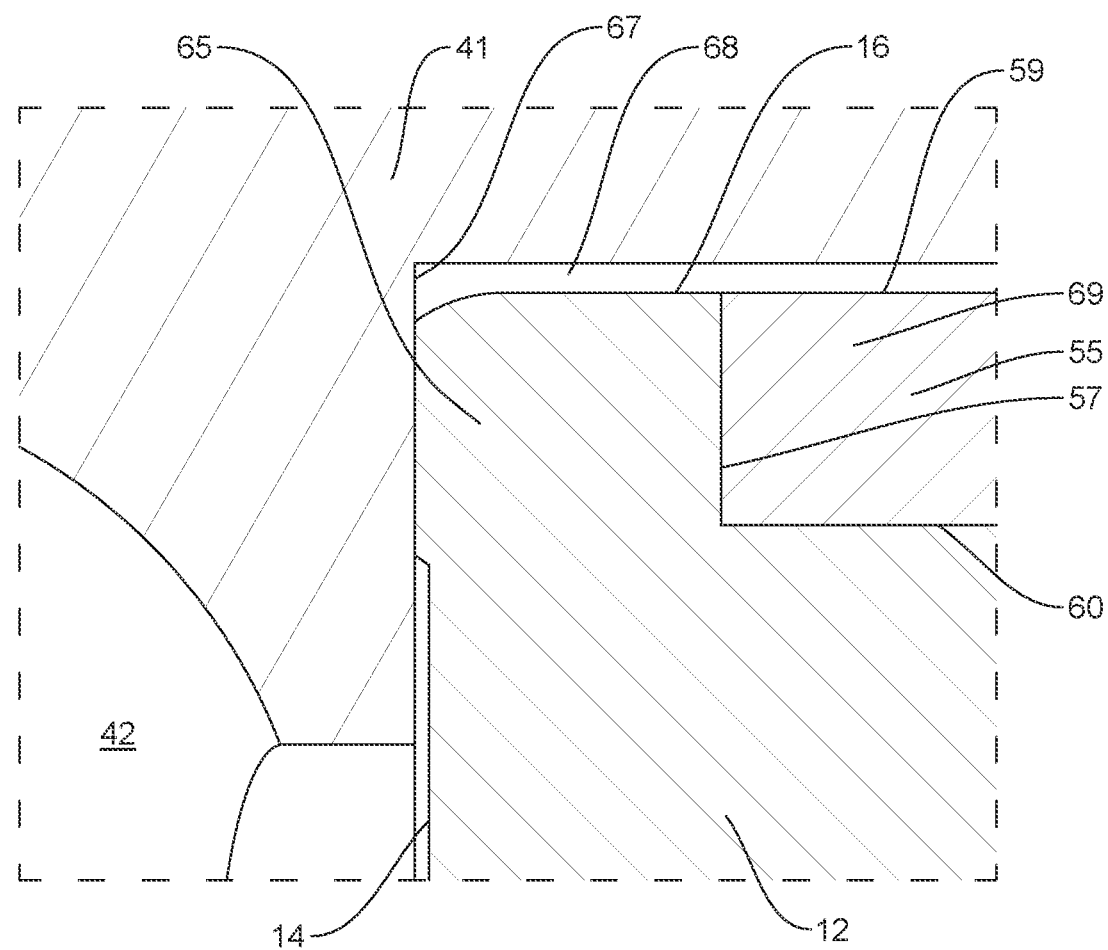
FIG. 4 is an enlarged sectional view taken along lines 4-4 from FIG. 2 now showing the outer housing of the ball screw actuator.

FIG. 4 shows a small bead of elastomer on the axial face of the seal. This bead creates a static seal to prevent egress or ingress around the outer diameter of the seal when an axial force is applied to the seal to clamp it in place. The shape of the bead can vary depending on the manufacturing method.

FIGS. 1 and 2 shows a clocking mechanism at the top of each figure. The seal assembly must contain a lug (tab) or a notch to interact with the ball screw nut hardware. This lug or notch keeps the seal threads oriented, 'in-time', with the threads on the ball screw shaft and nut.

The shape of the wiping bead and static bead can vary from a full radius shown in FIGS. 3 and 4 to a sharp, 'V', shape depending on the design requirements.

Figure 5:
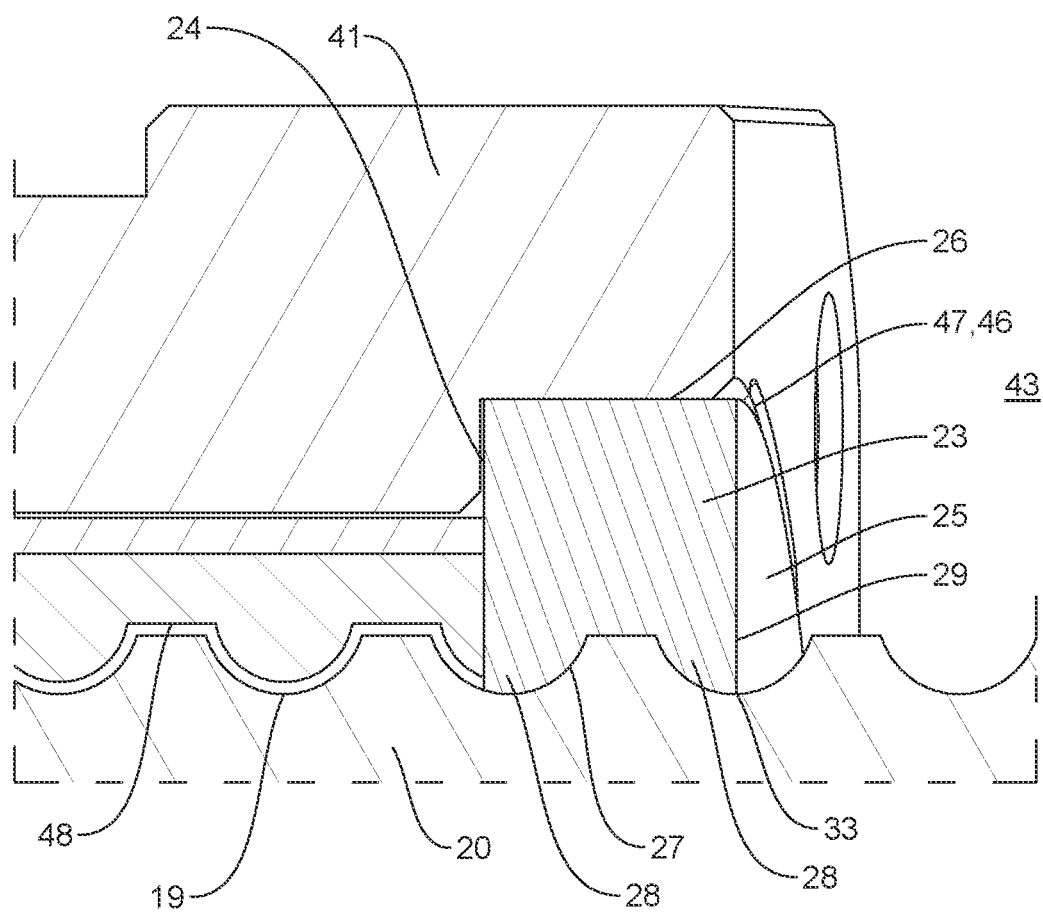
FIG. 5 is an enlarged sectional view of the structure of FIG. 1 now showing the internal shaft and outer housing of the ball screw actuator along with an ice breaker element.
Figure 6:
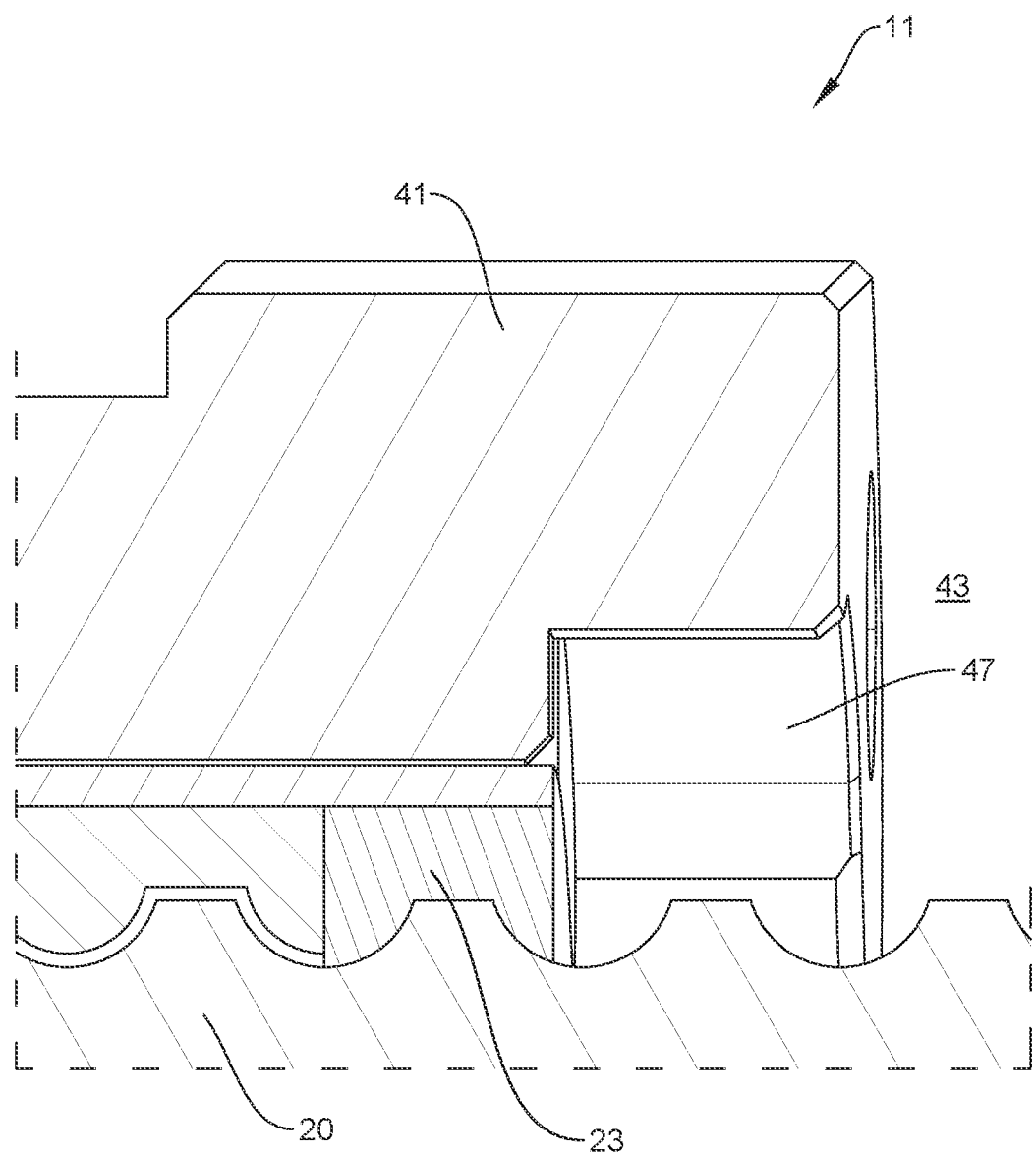
FIG. 6 is an enlarged sectional view of the structure of FIG. 1 now showing another embodiment of the present invention having the internal shaft and outer housing of the ball screw actuator along with an ice breaker element.

Reference is now being made to the figures of the present application which are very similar to the figures of the '572 provisional application. FIGS. 1-6 of the present application illustrate an embodiment of the present invention, which is a wiper seal assembly 10 configured for sealing a ball screw actuator 11. FIG. 1 is an isometric view of an embodiment of a wiper seal assembly of the present invention. FIG. 2 is a sectional view of the structure of FIG. 1 taken along lines 2-2. FIG. 3 is an enlarged sectional view taken along lines 3-3 from FIG. 2 now showing the internal shaft of the ball screw actuator. FIG. 4 is an enlarged sectional view taken along lines 4-4 from FIG. 2 now showing the outer housing of the ball screw actuator. FIG. 5 is an enlarged sectional view of the structure of FIG. 1 now showing the internal shaft and outer housing of the ball screw actuator along with an ice breaker element. FIG. 6 is an enlarged sectional view of the structure of FIG. 1 now showing another embodiment of the present invention having the internal shaft and outer housing of the ball screw actuator along with an ice breaker element.

A seal element 12 is annularly disposed about a longitudinal axis 13. The seal element defines a front side 14 opposite a back side 15, where the front and back sides are generally perpendicular to the longitudinal axis. The seal element also defines an outside circumferential surface 16 opposite an inside circumferential surface 17. The outside and inside circumferential surfaces are generally parallel with the longitudinal axis. The inside circumferential surface comprises a first helically shaped extension 18 having a first pitch 50 extending towards the longitudinal axis. The first helically shaped extension is configured to be disposed within a roller ball screw thread 19 of a shaft 20 of the ball screw actuator. The shaft is configured to be aligned along the longitudinal axis. A clearance 51 is configured to be between the first helically shaped extension and the roller ball screw thread.

The inside circumferential surface also comprises at least one wiping bead 52 being a second helically shaped extension 53 having a second pitch 54 extending towards the longitudinal axis. The at least one wiping bead is disposed at least partially over the first helically shaped extension. The at least one wiping bead is configured to make contact with the roller ball screw thread of the shaft of the ball screw actuator as best seen in FIG. 3.

A cylindrical ring 55 is annularly disposed about the longitudinal axis and extends a distance 56 along the longitudinal axis. The cylindrical ring defines a front side 57 opposite a back side 58, where the front and back sides are generally perpendicular to the longitudinal axis. The cylindrical ring defines an outside circumferential surface 59 opposite an inside circumferential surface 60, where the outside and inside circumferential surfaces being generally parallel with longitudinal axis. The cylindrical ring is in contact with and at least partially disposed about the seal element. The seal element is at least partially bonded to the cylindrical ring along this contact. Adhesion can be accomplished using bonding agents and/or adhesives. Bonding can also be accomplished using an overmold operation, where the seal element is molded with the cylindrical (metal) ring already placed within the mold.

In another exemplary embodiment, the seal element may have a first coefficient of thermal expansion 61 and the cylindrical ring may have a second coefficient of thermal expansion 62. The first coefficient of thermal expansion of the seal element may be larger than the second coefficient of thermal expansion of the cylindrical ring.

In another exemplary embodiment, the seal element may be made of an elastomer. For example, the seal element may be made of fluorosilicone, fluorovinylmethylsiloxane rubber (FVMQ), nitrile (NBR), hydrogenated nitrile (HNBR), fluorocarbon (FKM), silicone (VMQ), liquid silicone resin (LSR), thermoplastic elastomer (TPE) and/or any combination thereof. The seal element may have a Shore A hardness range of 40 to 80.

In another exemplary embodiment, the cylindrical ring may be made of a metal. Alternatively, the cylindrical ring may be made of stainless steel, steel, aluminum, plastic and/or any combination thereof.

In another exemplary embodiment, the first pitch of the first helically shaped extension and second pitch of the second helically shaped extension may be different. This is best seen in FIG. 2, where it is clear to see that the pitches are different. The first pitch of the first helically shaped extension and the second pitch of the second helically shaped extension may be in an opposite helical direction 64 as shown in FIG. 2 and in FIG. 7A.

Figure 7A:
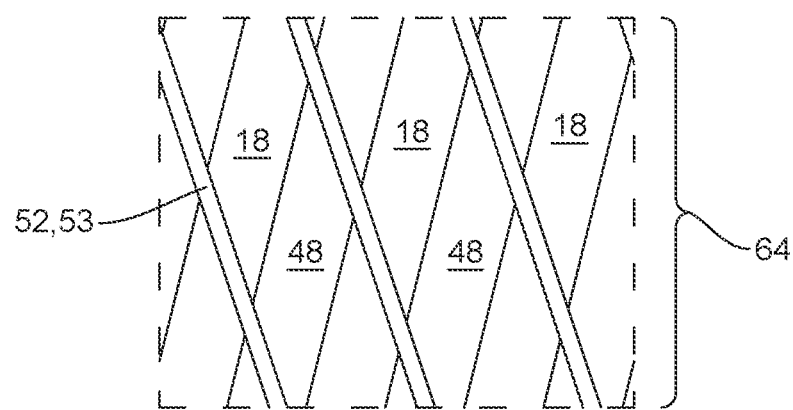
FIG. 7A is a theoretical plan view of the inside circumferential surface of the seal element shown in FIG. 2 if the inside circumferential surface was cut open and laid flat.

FIG. 7A is a theoretical plan view of the inside circumferential surface of the seal element shown in FIG. 2, if the inside circumferential surface was cut open and laid flat. This then allows us to better understand how the two helical structures overlap one another. The first helically shaped extension 18 is shown having the first pitch with flat cylindrical portions 48 disposed therebetween. The at least one wiping bead 52 is of a second helically shaped extension 53 that is in an opposite helical direction 64.

Figure 7B:
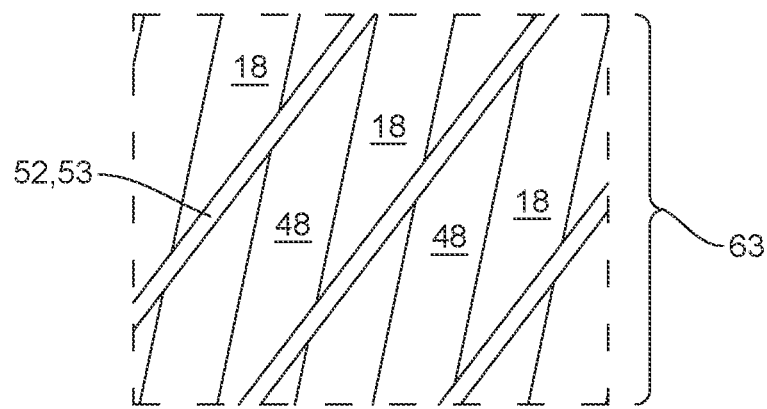
FIG. 7B is another theoretical plan view similar to FIG. 7A, now showing that while the first and second helically shaped extensions have different pitches they may be in a similar helical direction.

FIG. 7B is another theoretical plan view similar to FIG. 7A now showing that while the first and second helically shaped extensions have different pitches, they may be in a similar helical direction 63.

Figure 7C:
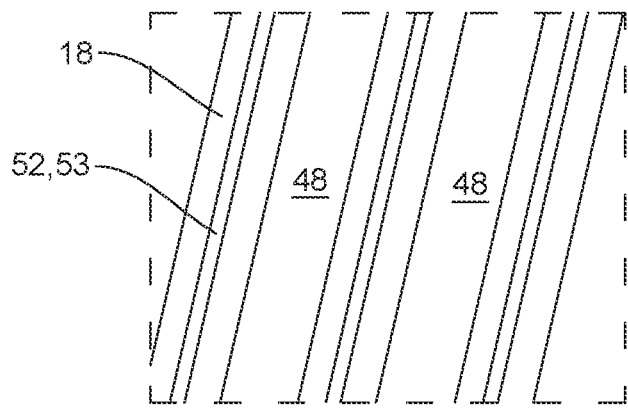
FIG. 7C is another theoretical plan view similar to FIG. 7A and &B, now showing that the first pitch of the first helically shaped extension and the second pitch of the second helically shaped extension may be the same pitch.

FIG. 7C is another theoretical plan view similar to FIG. 7A and &B, now showing that the first pitch of the first helically shaped extension and the second pitch of the second helically shaped extension may be the same pitch.

In other exemplary embodiments as shown in FIGS. 5 and 6, an ice breaker element 23 may be annularly disposed about the longitudinal axis. The ice breaker element defines a front side 24 opposite a back side 25, where the front and back sides are generally perpendicular to the longitudinal axis. The ice breaker element also defines an outside circumferential surface 26 opposite an inside circumferential surface 27, where the outside and inside circumferential surfaces are generally parallel with longitudinal axis.

The inside circumferential surface of the ice breaker comprises a third helically shaped extension 28 extending towards the longitudinal axis, wherein the third helically shaped extension is configured to be disposed within the roller ball screw thread of the shaft of the ball screw actuator. The third helically shaped extension extends to the front side of the ice breaker element forming an ice breaker lip 29.

When the ice breaker element is included, the seal element is disposed adjacent to the ice breaker element with the back side of the seal element being adjacent to the back side of the ice breaker element. It is understood from this teaching that the first helically shaped extension is helically aligned in comparison to the third helically shaped extension, wherein both the first and third helically shaped extensions are configured to be disposed within the roller ball screw thread of the shaft of the ball screw actuator. An edge 33 of the ice breaker lip is configured to be at or less than 0.005 inches (0.13 millimeters) from the roller ball screw thread of the shaft of the ball screw actuator. The seal element and the ice breaker element could be different materials, such that they are not the same materials. Furthermore, the ice breaker element may comprise aluminum bronze and/or stainless steel.

As best seen in FIGS. 2 and 4, an annular bead 65 may be disposed about the longitudinal axis and extending from the front side of the seal element. The annular bead is sealing against the vertical surface 67 of the housing, as an annular channel 68 is formed in the housing to receive the wiper seal assembly 10.

When the wiper seal assembly is installed between an outer housing 41 and the shaft of the ball screw actuator, the front side of the seal element is configured to be disposed towards a grease side 42 (See FIG. 4) and the rear side of the seal element is configured to be disposed towards an environmental side 43 (See FIGS. 5-6).

At least one clocking feature 66 may extend radially to the longitudinal axis from the outside circumferential surface of the cylindrical ring. The at least one clocking feature is configured to be disposed within at least one recess 47 formed in an outer housing 41 and mechanically locks in rotation the cylindrical ring and seal element in comparison to the outer housing.

Likewise, in another exemplary embodiment, at least one second clocking feature 46 may extend radially to the longitudinal axis from the outside circumferential surface of the ice breaker element. The at least one second clocking feature is configured to be disposed within the at least one recess 47 formed in the outer housing 41 and mechanically locks in rotation the ice breaker element in comparison to the outer housing. Alternatively, the ice breaker element could be rotational fixed relative to the wiper seal assembly, or vice versa. Furthermore, just one clocking feature is shown, but one, two, three, four or any number of clocking features and corresponding recesses could be used by those skilled in the art.

Referring to FIG. 4, the embodiment shown illustrates how the cylindrical ring is disposed within an annular channel 69 formed in the seal element. This then allows the outside circumferential surface 16 of the seal element to align perfectly to the outside circumferential surface 59 of the cylindrical ring. It is understood by those skilled in the art that the annular channel 69 could be eliminated such that the inside circumferential surface 60 of the cylindrical ring would be bonded to the outside circumferential surface 16 of the seal element. Furthermore, as shown in FIGS. 2 and 5, the end 15 of the seal element and the end 58 of the cylindrical ring are aligned. Likewise, it will be understood by those skilled in the art that this is not required as each end could be extended or retracted depending on the needs of the present invention.

NUMERALS 10 wiper seal assembly
11 ball screw actuator
12 seal element
13 longitudinal axis
14 front side
15 back side
16 outside circumferential surface
17 inside circumferential surface
18 first helically shaped extension
19 roller ball screw thread
20 shaft
23 ice breaker element
24 front side
25 back side
26 outside circumferential surface
27 inside circumferential surface
28 third helically shaped extension
29 ice breaker lip
33 edge
41 outer housing
42 grease side
43 environmental side
46 at least one second clocking feature, ice breaker element
47 at least one recess
48 flat cylindrical portion
50 first pitch, first helically shaped extension
51 clearance
52 at least one wiping bead
53 a second helically shaped extension
54 second pitch
55 a cylindrical ring
56 distance, cylindrical ring
57 front side, cylindrical ring
58 back side, cylindrical ring
59 outside circumferential surface, cylindrical ring
60 inside circumferential surface, cylindrical ring
61 first coefficient of thermal expansion, seal element
62 second coefficient of thermal expansion, cylindrical ring
63 similar helical direction
64 opposite helical direction
65 annular bead
66 at least one clocking feature, cylindrical ring
67 vertical surface, housing
68 annular channel, housing
69 annular channel, seal element

The invention claimed is:

1. A wiper seal assembly configured for sealing a ball screw actuator, comprising:
a seal element annularly disposed about a longitudinal axis;
the seal element defining a front side opposite a back side, the front and back sides being generally perpendicular to the longitudinal axis;
the seal element defining an outside circumferential surface opposite an inside circumferential surface, the outside and inside circumferential surfaces being generally parallel with the longitudinal axis;
wherein the inside circumferential surface comprises a first helically shaped extension having a first pitch extending towards the longitudinal axis, wherein the first helically shaped extension is configured to be disposed within a roller ball screw thread of a shaft of the ball screw actuator, wherein the shaft is configured to be aligned along the longitudinal axis, and wherein a clearance is configured to be between the first helically shaped extension and the roller ball screw thread;
wherein the inside circumferential surface comprises at least one wiping bead being a second helically shaped extension having a second pitch extending towards the longitudinal axis, the at least one wiping bead disposed at least partially over the first helically shaped extension, wherein the at least one wiping bead is configured to make contact with the roller ball screw thread of the shaft of the ball screw actuator;
a cylindrical ring annularly disposed about the longitudinal axis and extending a distance along the longitudinal axis;
the cylindrical ring defining a front side opposite a back side, the front and back sides being generally perpendicular to the longitudinal axis;
the cylindrical ring defining an outside circumferential surface opposite an inside circumferential surface, the outside and inside circumferential surfaces being generally parallel with longitudinal axis;
wherein the cylindrical ring is in contact with and at least partially disposed about the seal element; and
wherein the seal element is at least partially bonded to the cylindrical ring.

2. The wiper seal assembly of claim 1, wherein the seal element has a coefficient of thermal expansion and the cylindrical ring has a coefficient of thermal expansion.

3. The wiper seal assembly of claim 2, wherein the coefficient of thermal expansion of the seal element is larger than the coefficient of thermal expansion of the cylindrical ring.

4. The wiper seal assembly of claim 1, wherein the seal element is made of an elastomer.

5. The wiper seal assembly of claim 4, wherein the seal element is made of fluorosilicone, fluorovinylmethylsiloxane rubber (FVMQ), nitrile (NBR), hydrogenated nitrile (HNBR), fluorocarbon (FKM), silicone (VMQ), liquid silicone resin (LSR), thermoplastic elastomer (TPE) and/or any combination thereof.

6. The wiper seal assembly of claim 4, wherein the seal element has a Shore A hardness range of 40 to 80.

7. The wiper seal assembly of claim 4, wherein the cylindrical ring is made of a metal.

8. The wiper seal assembly of claim 4, wherein the cylindrical ring is made of stainless steel, steel, aluminum, plastic and/or any combination thereof.

9. The wiper seal assembly of claim 1, wherein the first pitch of the first helically shaped extension and second pitch of the second helically shaped extension are different.

10. The wiper seal assembly of claim 1, wherein the first pitch of the first helically shaped extension and the second pitch of the second helically shaped extension are in a similar helical direction.

11. The wiper seal assembly of claim 1, wherein the first pitch of the first helically shaped extension and the second pitch of the second helically shaped extension are in an opposite helical direction.

12. The wiper seal assembly of claim 1, wherein the first pitch of the first helically shaped extension and the second pitch of the second helically shaped extension are the same.

13. The wiper seal assembly of claim 1, including an ice breaker element annularly disposed about the longitudinal axis, the ice breaker element defining a front side opposite a back side, the front and back sides being generally perpendicular to the longitudinal axis, the ice breaker element defining an outside circumferential surface opposite an inside circumferential surface, the outside and inside circumferential surfaces being generally parallel with longitudinal axis, wherein the inside circumferential surface comprises a third helically shaped extension extending towards the longitudinal axis, wherein the third helically shaped extension is configured to be disposed within the roller ball screw thread of the shaft of the ball screw actuator, wherein the third helically shaped extension extends to the front side of the ice breaker element forming an ice breaker lip, and wherein the seal element is disposed adjacent to the ice breaker element with the back side of the seal element being adjacent to the back side of the ice breaker element.

14. The wiper seal assembly of claim 13, wherein the first helically shaped extension is helically aligned in comparison to the third helically shaped extension, wherein both the first and third helically shaped extensions are configured to be disposed within the roller ball screw thread of the shaft of the ball screw actuator.

15. The wiper seal assembly of claim 13, wherein an edge of the ice breaker lip is configured to be at or less than 0.005 inches from the roller ball screw thread of the shaft of the ball screw actuator.

16. The wiper seal assembly of claim 13, wherein the seal element and the ice breaker element are not the same materials, wherein the ice breaker element comprises aluminum bronze and/or stainless steel.

17. The wiper seal assembly of claim 1, including an annular bead disposed about the longitudinal axis and extending from the front side of the seal element.

18. The wiper seal assembly of claim 1, wherein, when the wiper seal assembly is installed between an outer housing and the shaft of the ball screw actuator, the front side of the seal element is configured to be disposed towards a grease side and a rear side of the seal element is configured to be disposed towards an environmental side.

19. The wiper seal assembly of claim 1, including at least one clocking feature extending radially to the longitudinal axis from the outside circumferential surface of the cylindrical ring, wherein the at least one clocking feature is configured to be disposed within at least one recess formed in an outer housing and mechanically locks in rotation the cylindrical ring and seal element in comparison to the outer housing.

20. The wiper seal assembly of claim 13, including at least one second clocking feature extending radially to the longitudinal axis from the outside circumferential surface of the ice breaker element, wherein the at least one second clocking feature is configured to be disposed within the at least one recess formed in the outer housing and mechanically locks in rotation the ice breaker element in comparison to the outer housing.

21. A wiper seal assembly configured for sealing a ball screw actuator, comprising:
a seal element annularly disposed about a longitudinal axis, the seal element comprising:
a front side opposite a back side, the front and back sides being generally perpendicular to the longitudinal axis;
an outside circumferential surface opposite an inside circumferential surface, the outside and inside circumferential surfaces being generally parallel with the longitudinal axis;
wherein the inside circumferential surface comprises a first helically shaped extension having a first pitch extending towards the longitudinal axis, wherein the first helically shaped extension is configured to be disposed within a roller ball screw thread of a shaft of the ball screw actuator, wherein the shaft is configured to be aligned along the longitudinal axis, and wherein a clearance is configured to be between the first helically shaped extension and the roller ball screw thread;
wherein the inside circumferential surface comprises at least one wiping bead being a second helically shaped extension having a second pitch extending towards the longitudinal axis, the at least one wiping bead disposed at least partially over the first helically shaped extension, wherein the at least one wiping bead is configured to make contact with the roller ball screw thread of the shaft of the ball screw actuator;

a cylindrical ring annularly disposed about the longitudinal axis and extending a distance along the longitudinal axis, the cylindrical ring comprising:
  a front side opposite a back side, the front and back sides being generally perpendicular to the longitudinal axis;
  an outside circumferential surface opposite an inside circumferential surface, the outside and inside circumferential surfaces being generally parallel with longitudinal axis; and
at least one clocking feature extending radially to the longitudinal axis from the outside circumferential surface of the cylindrical ring, wherein the at least one clocking feature is configured to be disposed within at least one recess formed in an outer housing and mechanically locks in rotation the cylindrical ring and seal element in comparison to the outer housing;

wherein the cylindrical ring is in contact with and at least partially disposed about the seal element, and wherein the seal element is at least partially bonded to the cylindrical ring;

wherein the seal element has a coefficient of thermal expansion and the cylindrical ring has a coefficient of thermal expansion, wherein the coefficient of thermal expansion of the seal element is larger than the coefficient of thermal expansion of the cylindrical ring; and wherein the seal element is made of an elastomer and wherein the seal element has a Shore A hardness range of 40 to 80.

* * * * *